United States Patent [19]

Huffman

[11] Patent Number: 4,702,561

[45] Date of Patent: Oct. 27, 1987

[54] PLEOCHROIC DYES AND ELECTRO-OPTICAL DISPLAYS THEREWITH

[75] Inventor: William A. Huffman, Minneapolis, Minn.

[73] Assignee: Minnesota Mining and Manufacturing Company, St. Paul, Minn.

[21] Appl. No.: 70,421

[22] Filed: Aug. 28, 1979

Related U.S. Application Data

[63] Continuation-in-part of Ser. No. 908,671, May 23, 1978, abandoned, which is a continuation-in-part of Ser. No. 786,489, Apr. 11, 1977, abandoned.

[51] Int. Cl.$^4$ .................. C09K 19/00; G02F 1/13
[52] U.S. Cl. .................. 350/349; 252/299.1; 350/346
[58] Field of Search .................. 252/299, 408, 299.1; 250/346, 349, 350 R

[56] References Cited

U.S. PATENT DOCUMENTS

| | | | |
|---|---|---|---|
| 3,597,044 | 8/1971 | Castellano | 252/299 |
| 3,703,329 | 11/1972 | Castellano | 252/299 |
| 3,833,287 | 9/1974 | Taylor et al. | 252/299 |
| 3,864,022 | 2/1975 | Moriyama et al. | 252/299 |
| 3,960,750 | 6/1976 | Moriyama et al. | 252/299 |
| 3,960,751 | 6/1976 | Moriyama et al. | 252/299 |
| 4,105,299 | 8/1978 | Huffman et al. | 252/299 |
| 4,105,654 | 8/1978 | Bloom et al. | 252/299 |
| 4,128,496 | 12/1978 | Cole, Jr. et al. | 252/299 |
| 4,128,497 | 12/1978 | Cole, Jr. et al. | 252/299 |
| 4,130,502 | 12/1978 | Eidenschink et al. | 252/299 |
| 4,137,193 | 1/1979 | Osman et al. | 252/299 |
| 4,143,947 | 3/1979 | Aftergut et al. | 252/299 |
| 4,145,114 | 3/1979 | Coates et al. | 252/299 |
| 4,153,343 | 5/1979 | Bloom et al. | 252/299 |
| 4,154,697 | 5/1979 | Eidenschink et al. | 252/299 |
| 4,154,746 | 5/1979 | Huffman | 252/299.1 |
| 4,232,949 | 11/1980 | Huffman | 252/299.1 |
| 4,232,950 | 11/1980 | Benham | 252/299.1 |
| 4,273,929 | 6/1981 | Boller et al. | 252/299.61 |
| 4,279,152 | 7/1981 | Crossland | 73/356 |
| 4,291,948 | 9/1981 | Crossland et al. | 252/299.1 |
| 4,360,447 | 11/1982 | Morihaka et al. | 252/299.1 |
| 4,396,251 | 8/1983 | Mukoh et al. | 250/349 |

FOREIGN PATENT DOCUMENTS

| | | | |
|---|---|---|---|
| 2104 | 5/1979 | European Pat. Off. | 252/299.1 |
| 26004 | 4/1981 | European Pat. Off. | 252/299.1 |
| 2815335 | 10/1978 | Fed. Rep. of Germany | 252/299 |
| 54-126059 | 9/1979 | Japan | 252/299.1 |
| 55-123673 | 9/1980 | Japan | 252/299.1 |
| 55-127485 | 10/1980 | Japan | 252/299.1 |
| 2011940 | 7/1979 | United Kingdom | 252/299 |
| 2037803 | 7/1980 | United Kingdom | 252/299.1 |

OTHER PUBLICATIONS

Cox, R. J., Mol. Cryst. Liq. Cryst., vol. 55, pp. 1–32 (1979).

Constant, J. et al., "Photostable Anthraquinone Pleochroic Dyes", presented at 7th Intern'l Liq. Cryst. Conf., Bordeaux France (Jul. 1978).

Bloom, A. et al., Mol. Cryst. Liq. Cryst., vol. 41 (Letters), pp. 1–4 (1977).

Bloom, A., et al., Mol. Cryst. Liq. Cryst., vol. 40, pp. 213–221 (1977).

White, D. L., et al, J. Appl. Phys., vol. 45, No. 11, pp. 4718–4722 (1974).

Primary Examiner—Teddy S. Gron
Attorney, Agent, or Firm—Donald M. Sell; James A. Smith; Warren R. Bovee

[57] ABSTRACT

N-substituted anthraquinones in which the substituent group is at least partially cyclic, either cyclohexyl or aromatic, and including anils of 1,4- and 1,8-diaminoanthraquinone with p-alkyl- and p-alkoxybenzaldehyde, are pleochroic and form guest-host combinations with dielectrically positive anisotropic nematic liquid crystals. These combinations are of value in electro-optical display devices.

32 Claims, 18 Drawing Figures

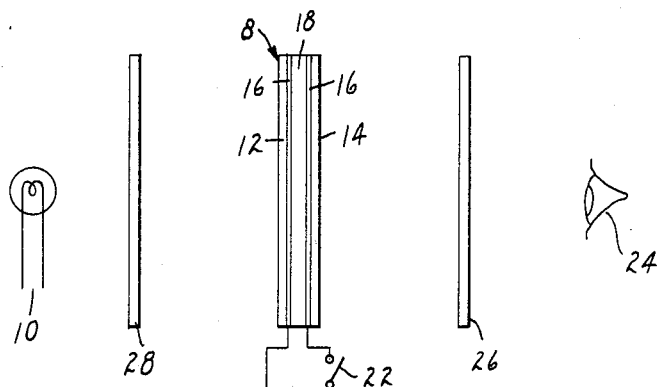
FIG.1
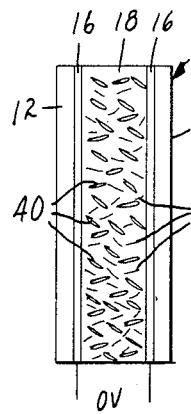 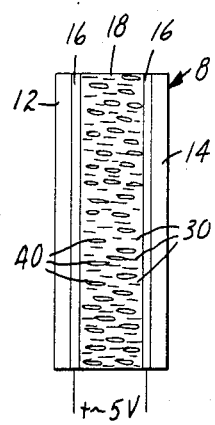 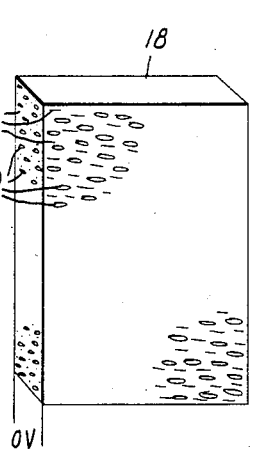 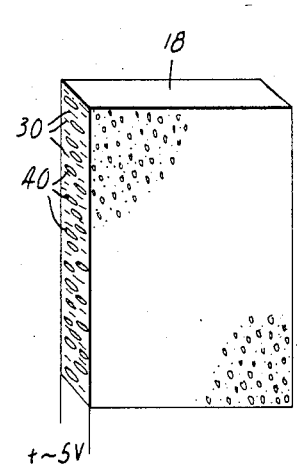
FIG.2    FIG.3    FIG.4    FIG.5
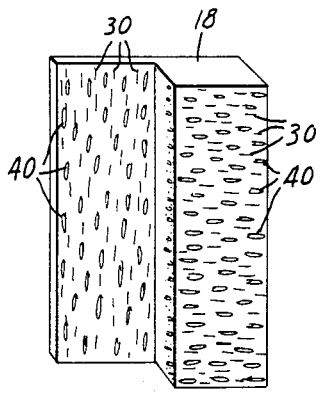 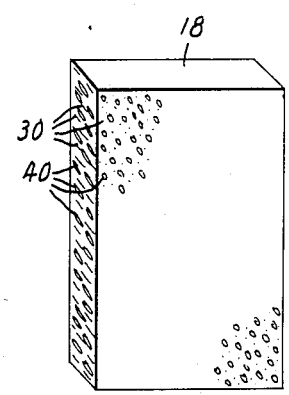 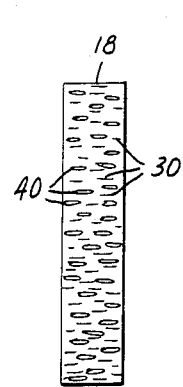
FIG.6    FIG.7    FIG.8

PLEOCHROIC DYES AND ELECTRO-OPTICAL DISPLAYS THEREWITH

This application is a continuation-in-part of copending application Ser. No. 908,671, filed May 23, 1978, now abandoned, which in turn is a continuation-in-part of application Ser. No. 786,489, filed Apr. 11, 1977 and now abandoned.

This invention relates to guest-host combinations of pleochroic anils and N-substituted cyclic derivatives of mono- and di-aminoanthraquinones with dielectrically positive nematic liquid crystals. This invention further relates to electro-optical devices employing the said guest-host combinations.

Electro-optical devices in which liquid crystals are employed usually comprise two transparent flat plates having very thin transparent electrodes on their inwardly facing surfaces, separated by from a few microns to a few tens of microns and with a liquid crystalline composition filling the space between the plates. It is these plates which are referred to below as walls of the vessel. Impressing an electric field on the liquid crystal affects the optical properties of the layer of liquid crystal.

It was discovered by Heilmeier and Zanoni, Applied Physics Letters, Vol. 13, pages 91–92 (1968) that, when pleochroic dyes are combined with nematic liquid crystals in a device such as above, the pleochroic colors of the dye are manifested as an electric field is applied and released. The nematic liquid is referred to as the "host" and the pleochroic dye as the "guest" so that the composition is referred to as a guest-host combination. The phenomenon has been utilized in U.S. Pat. Nos. 3,551,026, 3,597,044 and 3,960,751 to produce electro-optical devices.

In order for an electro-optical device employing nematic liquid crystals to be operable the liquid crystal must have an oriented structure which is controlled by the direction of an applied electric field. Liquid crystals (mesomorphic substances) tend to have rod-like molecules. When the long axes of the liquid crystals are perpendicular to the walls of the cell or vessel the structure is termed homeotropic. When the long axes of the liquid are parallel to the walls of the cell or vessel the structure is termed homogeneous because of the homogeneous boundary conditions. When two homogeneously orienting walls are at right angles of lines of orientation a twisted nematic liquid crystalline structure is achieved.

Homogeneous boundary conditions may be achieved by several techniques each of which offers advantages for certain purposes. These are well known in the art and do not need to be described in detail. Suitable techniques comprise rubbing with polishing materials such as rouge, zirconium oxide, etc., mechanical surface scribing or deformation, deposition of organic materials such as trimethoxy silane followed by rubbing, and by deposition of inorganic materials such as metal oxides or magnesium fluoride vapor deposited at angles of 1°–30° to the coated surface or deposition at angles above 30° followed by rubbing.

Homeotropic boundary conditions, which are desirable in the phase change cholesteric to nematic display, are obtained, for example, by coating with metal oxides at angles well above 30° or treatment with surface active agents and organosilane coupling agents as is well known in the art.

Dielectrically positive anisotropy is exhibited by liquid crystals which tend to align longitudinally with an impressed field. Such compounds are of particular significance for guest-host combinations of the invention. It is usually only necessary that the overall effect is that of dielectrically positive anisotropy so that the liquid crystalline host may be composed of high percentages of dielectrically negative anisotropic materials with smaller amounts of highly dielectrically positive anisotropic materials.

Many pleochroic dyes which are useful in guest-host combinations tend to have elongated molecules which exhibit little or no absorption of light vibrating parallel to the long axis while absorbing that light in various portions of the visible spectrum which vibrates parallel to the short axis. Other pleochroic dyes may align oppositely, being colorless (non-absorbing) with respect to light vibrating parallel to axis of the molecule and colored (absorbing) with respect to light vibrating parallel to the long axis.

When combined with nematic liquid crystals having a homeotropic structure, i.e. molecules perpendicular to walls of vessel, the molecules of the first above type of pleochroic dye then align with those of the host liquid crystal and no color is seen until an electric field is imposed. Correspondingly, when the same pleochroic dye is combined with a nematic liquid crystal having the homogeneous, twisted structure, the molecules are cooperatively aligned with the liquid crystal molecules and the combination appears colored until an electric field is applied.

By combining two pleochroic dyes, one each of the above two types, devices which change from one color to another are evidently possible. A further effect is obtained by incorporating an isotropic, i.e., non-pleochroic, dyestuff with a pleochroic dyestuff so that the colors of the two are additive at one stage and the isotropic dyestuff appears at the other stage of cycling the electric field.

In order that there be a cycle between colorless and colored or between two colors for a given device it is obviously imperative to employ the dye in amounts which are alignable by the nematic liquid crystal, i.e., not in excess of the proportions which are within the capabilities of alignment by the amount of liquid crystal present. This is usually found to be up to about 5% by weight. In some cases the solubility of the pleochroic dye in the liquid crystal is inadequate to achieve concentrations above 1–5% by weight. Guest-host combinations of the prior art are capable of achieving contrasts from zero to maximum electric field of about 2:1 up to about 4:1. It would be desirable to have greater solubilities and higher contrasts and these are therefore aims and objects of the inventions.

In accordance with these aims and objects it has been found that a very useful group of pleochroic dyes for use in guest-host combinations are provided by anthraquinones of the general formula:

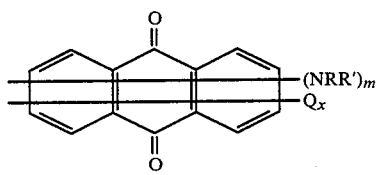

wherein substituents (NRR') and Q may be in positions 1 through 8,
Q is F, Cl, NO₂, NH₂, NH(Alk), OH,
x is 0, 1, 2, 3,
m is 1 or 2,
R is H,
R' is cyclohexyl, bicyclohexyl or —(CH₂)$_p$—Ar where p is 0, 1 or 2 and Ar is aryl of 6 to 10 carbon atoms substituted in the 4 position by —NHCOCH₃, CN, C$_b$H$_{2b+1}$, —OC$_n$H$_{2n+1}$, cyclohexyl, 4-(Alk)-cyclohexyl or

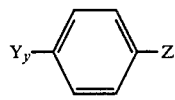

where
y is 0 or 1
Y is CH₂, O, S, or OCH₂
Z is H, NO₂, CN, —C$_n$H$_{2n+1}$, —OC$_n$H$_{2n+1}$, F, Cl, and,
when y is 0, Z can can also be —C₆H₅, and
wherein Ar can be substituted in from 0 to 2 further positions by CN, —C$_n$H$_{2n+1}$, —OC$_n$H$_{2n+1}$, NH₂, or OH, provided that when p is 1 or 2 Ar can be unsubstituted aryl,
or, alternatively,
when m is 2, the substituent R and R' taken together with N to which R is attached, that is, the substituent —(NRR') taken as a whole, is

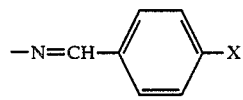

where
X is NO₂, CN, —C$_n$H$_{2n+1}$, —OC$_n$H$_{2n+1}$, or N(Alk)₂,
n is 1 to 20,
b is 2 to 20; provided that when p is 1 or 2 b can be 1 to 20, and Alk is alkyl of 1-8 carbon atoms.

The substituted anthraquinones of the above general formula are found to form particularly useful guest-host combinations with dielectrically positive anisotropic, nematic compounds or compositions, such as n-pentyl phenyl cyclohexyl cyanide or p-heptyl-4-cyanobiphenyl, or compositions including these compounds in dominating amounts, i.e. providing net dielectrically positive anisotropy. It will be understood herein that positive anisotropy refers to dielectrically positive anisotropy. Compounds of the invention can be employed alone and in combinations at up to equal proportions by weight with the nematic compounds to obtain contrast ratios up to about 20:1 or more.

A particularly useful series of pleochroic dyes are the diaminoanthraquinone bisanils of the general formula

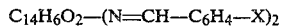

where C₁₄H₆O₂ is an anthraquinone radical having valences at 1,4 or 1,8, C₆H₄ is a p-phenylene and X is nitro, cyano, alkyl of 1-20 carbon atoms, alkoxy of 1 to 20 carbon atoms or di(lower alkyl)amino containing alkyl of 1-4 carbon atoms.

The compounds of the above formula are further remarkable in providing exceptionally high values of the optical order parameter S. This parameter is a measure of the efficiency of orientation of a dye. It is determined by measuring absorption of light as the reciprocal of percent transmission at $\lambda_{max}$ through a liquid crystal solution of the dye between electrode-coated plates in a cell as described above with and without an impressed field. Where A₁ and A₀ are the absorption with and without field respectively, $$S = \frac{A_0 - A_1}{A_0 + 2A_1}$$

The parameter S is given as a decimal number less than 1. In most instances, the alignment characteristics of the liquid crystal are imperfect and unity cannot be achieved. Thermal fluctuations, molecular structure, and physic-chemical properties of the liquid crystal molecule in relationship to the boundary conditions induced by the surface affect the degree of molecular alignment. The order parameter of a guest molecule may then also be considered to be some number S normalized to the degree of total order of the guest-host system. For a given dye it may vary somewhat depending on the particular nematic liquid crystal employed as host. Pleochroic dyes of the prior art provided values of S of the order of about 0.3 to 0.5. Compounds of the above formula have optical order parameters of 0.5 and higher and in preferred compounds are 0.7 and higher. Values of 0.9 and higher are found for some particularly useful compounds. This is a very high range of values not to be expected from any prior art teachings.

The unusual properties of the instant pleochroic dyestuffs render them of value in combinations with nematic liquid crystals of net positive anisotropy in display devices as for calculators, watches, etc. and also for use as electronic shutters for devices such as cameras and projectors and by use in a specular arrangement they assist in providing mirrors which can pass from specular to transparent and can be employed in cameras or wherever mirrors are used.

Reference is now made to the several drawings herewith wherein

FIG. 1 shows diagrammatically an electro-optical valve device employing guest-host combinations of pleochroic dyes of the invention.

FIG. 2 shows in diagrammatic fashion a homeotropic guest-host combination of the invention in the quiescent state with no impressed voltage.

FIG. 3 shows the hometropic guest-host combination of FIG. 2 with impressed voltage.

FIGS. 4 and 5 show combinations in guest host relationship of homogeneous positive anisotropic nematic liquid crystals and dyes of the invention without and with impressed voltage respectively.

FIGS. 6, 7 and 8 show combinations of FIGS. 4 and 5 but with orientation of walls of cell at right angles giving twisted nematic liquid crystals. FIG. 6 is without and FIGS. 7 and 8 with impressed voltage.

Figure 9:
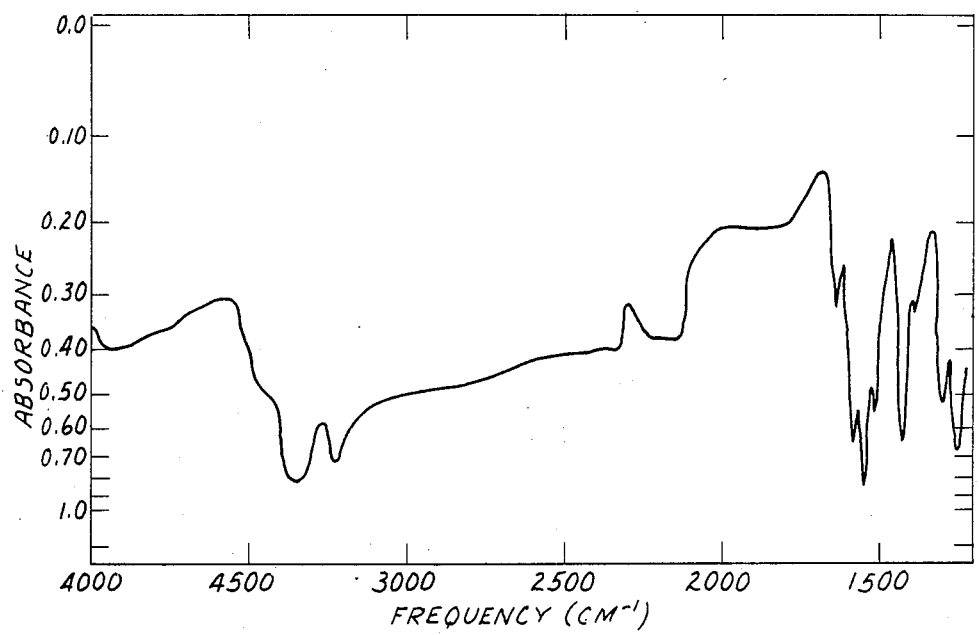
Figure 10:
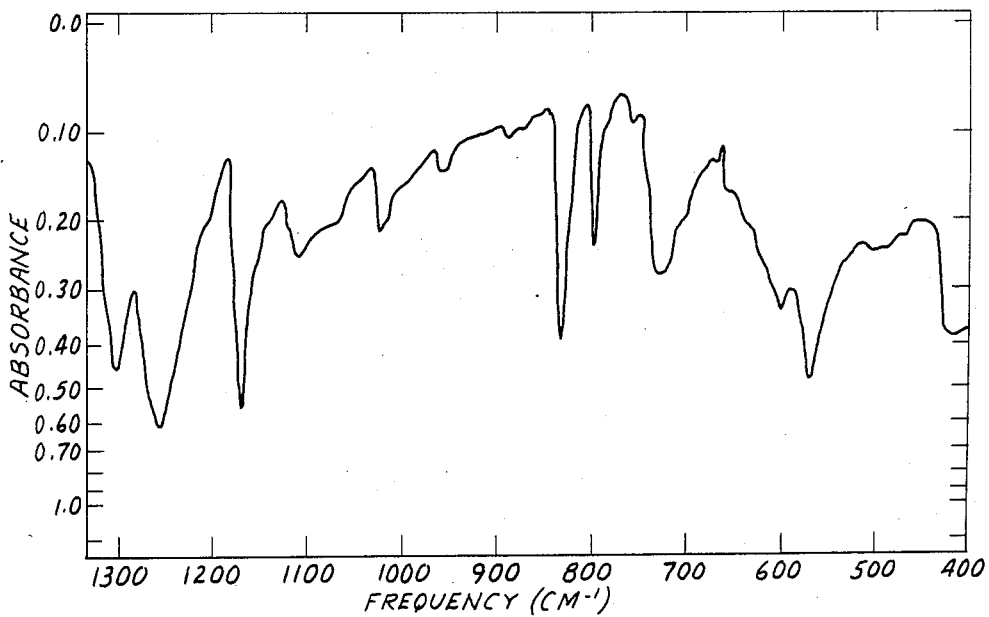

FIGS. 9 and 10 shw the infra red absorption curve for 1,4-bis(p-n-octyloxybenzylidene amino)anthraquinone.

Figure 11:
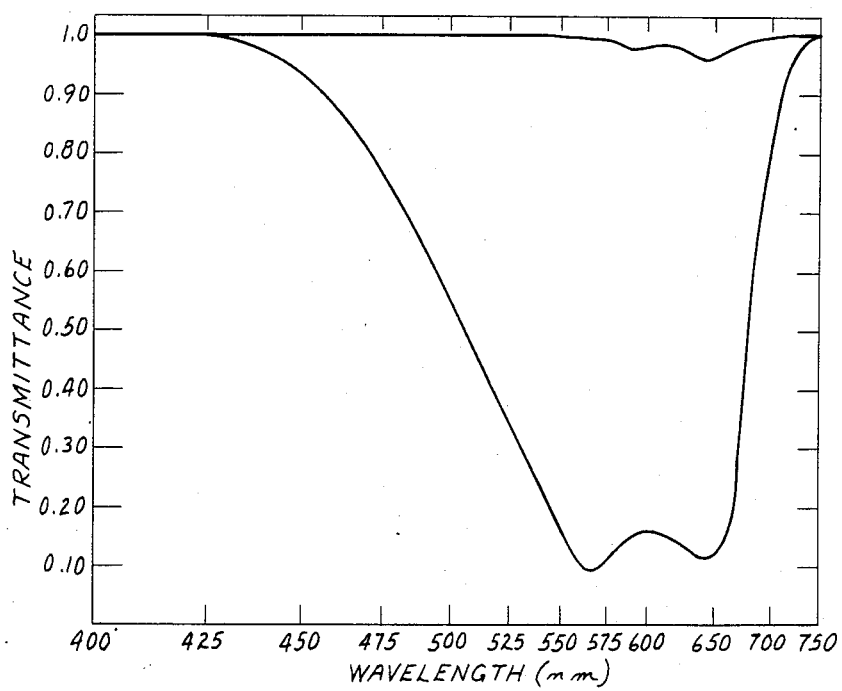

FIG. 11 shows transmittance curves of 5% solution of 1,4-bis(p-n-octylbenzylidene amino)anthraquinone dissolved in positive anisotropic nematic liquid crystal (4-cyano-4'-n-pentylbiphenyl) with and without impressed voltage as in FIGS. 2 and 3, etc.

Figure 12:
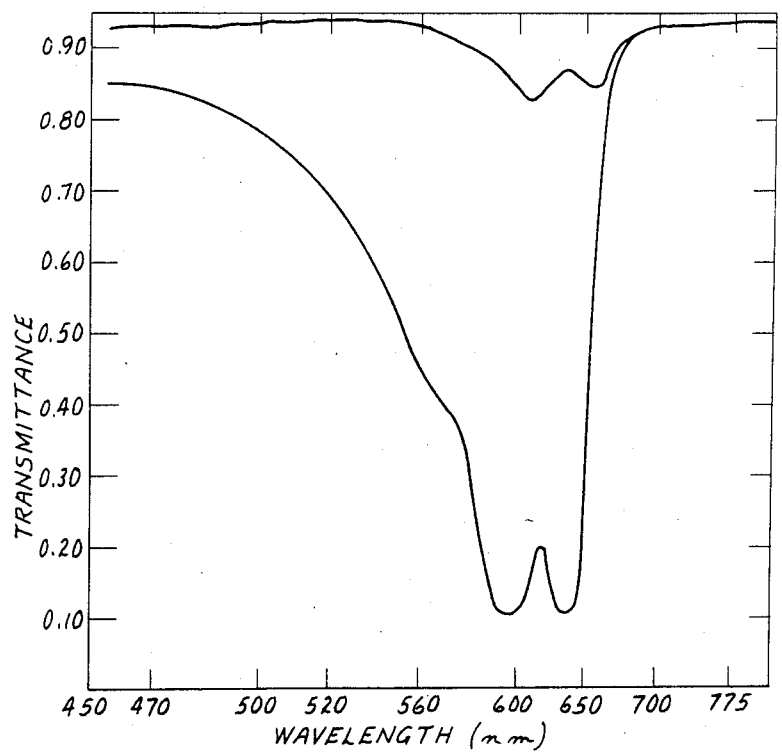

FIG. 12 shows transmittance curves of a 5% solution of 1,4-bis(p-n-hexylbenzylidene amino)anthraquinone in a composite nematic host.

Figure 13:
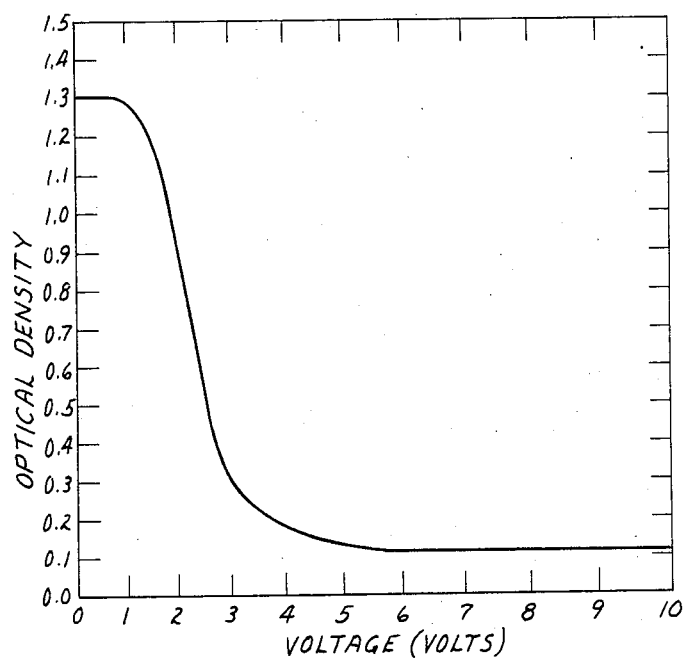
Figure 14:
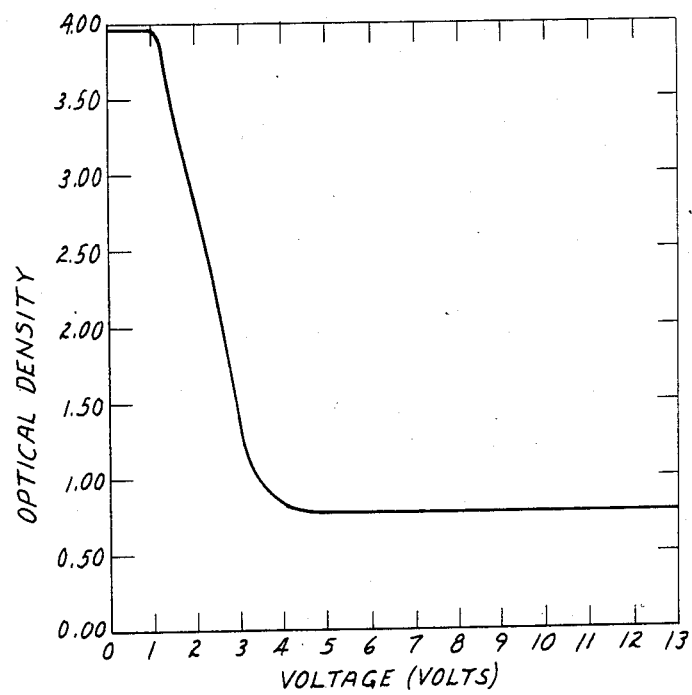

FIGS. 13 and 14 show decrease in optical density (ordinates) with increasing impressed voltage (abscissae) solutions of the dye of FIG. 11 in N-p-(n-hexylbenzylidene)-p'-aminobenzonitrile at 5 and 33% concentration respectively.

Figure 15:
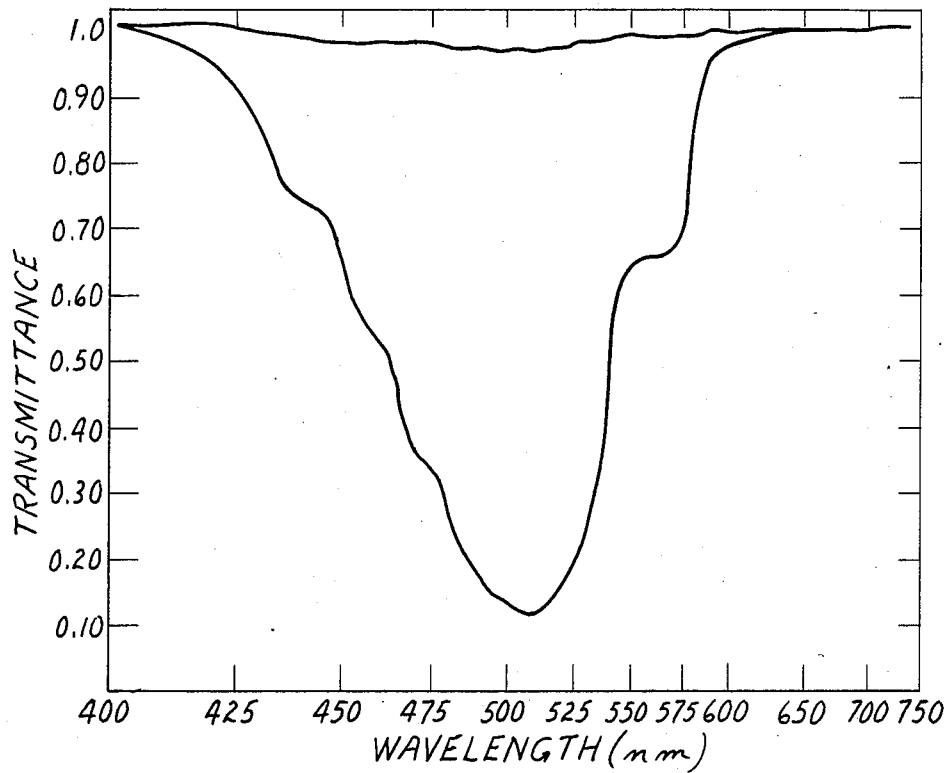
Figure 16:
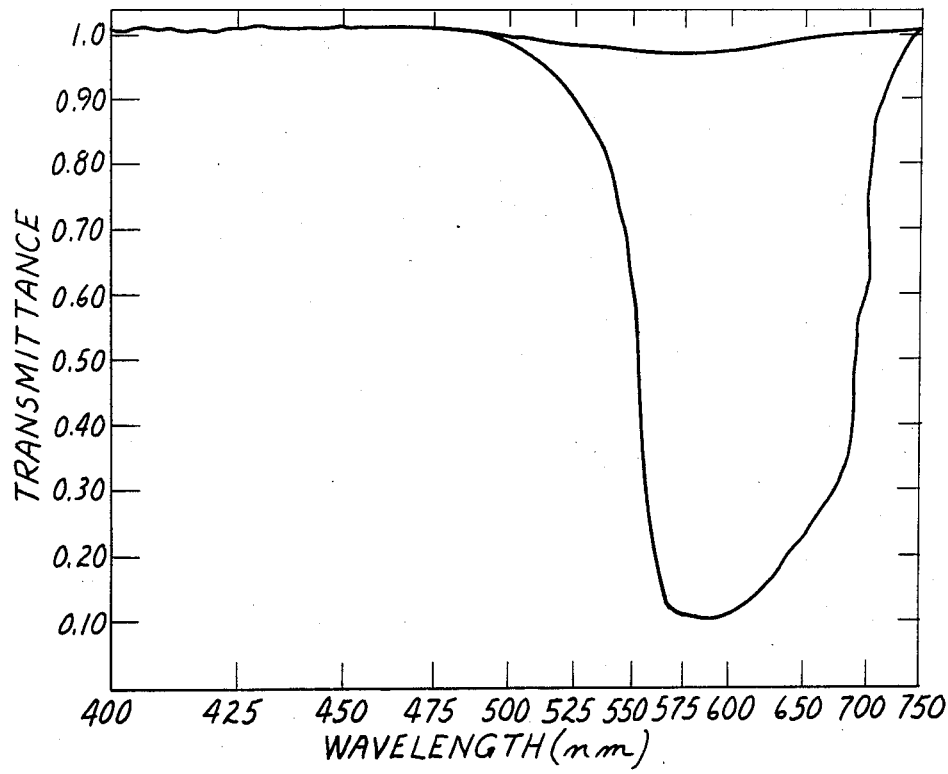
Figure 17:
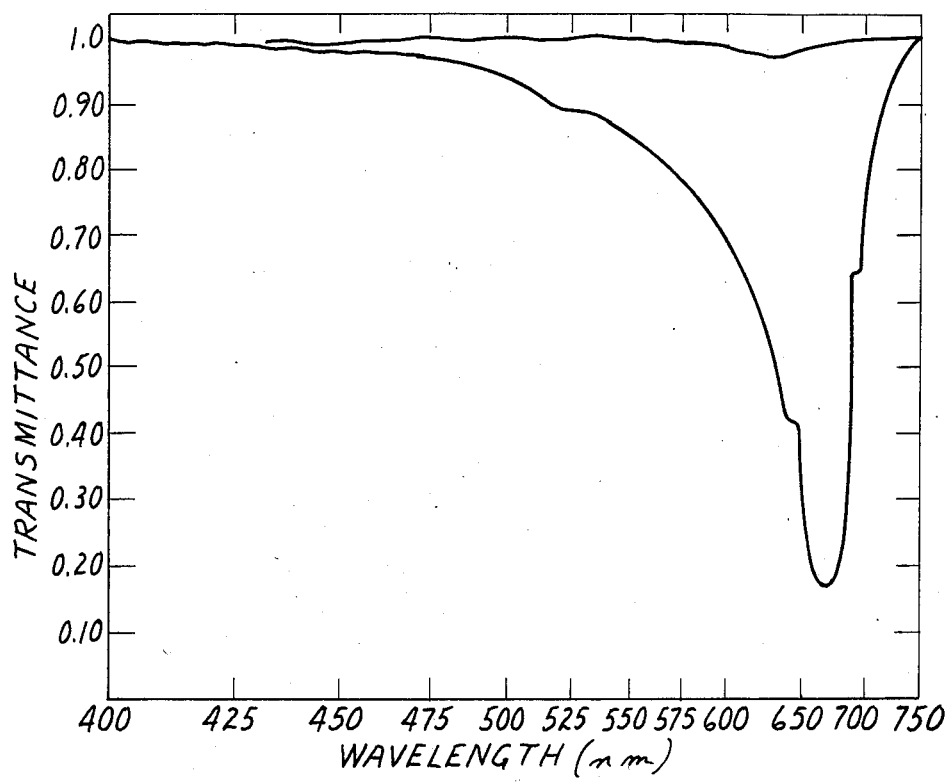
Figure 18:
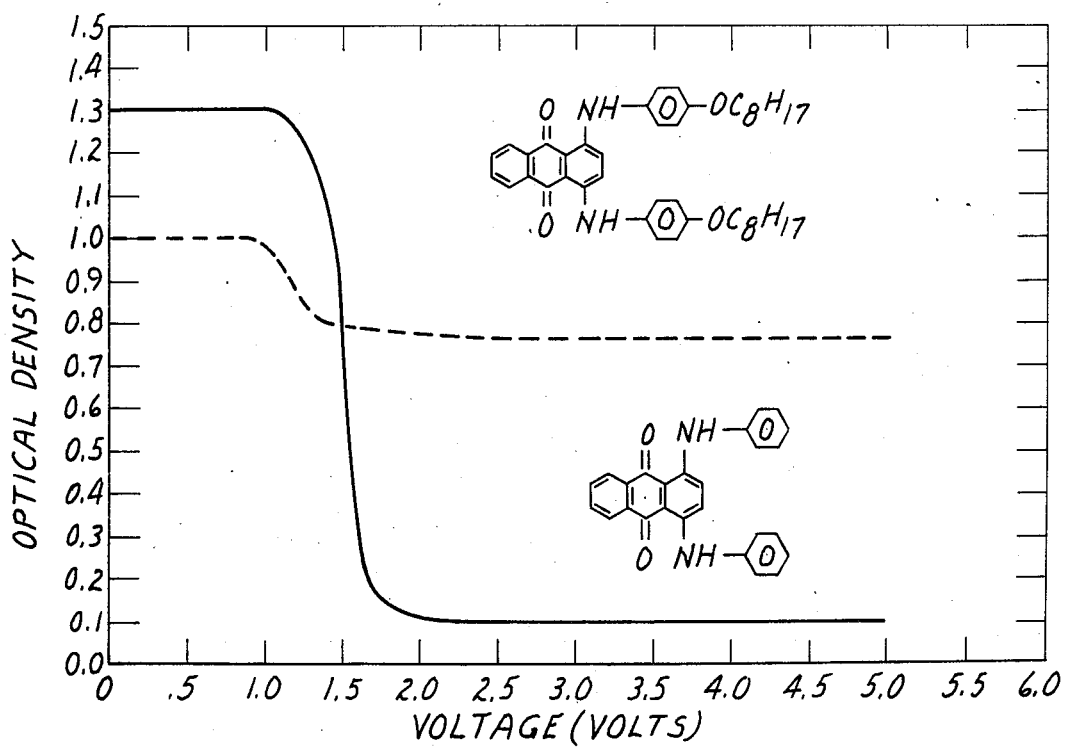

FIGS. 15, 16, and 17 show transmittance curves of 5% solutions of 1,5-bis(4-cyclohexylphenyl)anthraquinone, 1-methylamino-2-undecyl-4-(4-octylanilino)anthraquinone and 1,4-bis(4-phenylanilino)anthraquinone, respectively. FIG. 18 shows comparative curves of decrease of optical density with increasing applied voltage in a test cell.

In FIG. 1 a cell (8) is shown having walls (12) and (14) inwardly coated with conductive coatings of tin and/or indium oxide (16) and containing guest-host combination (18) of positive anisotropic nematic liquid crystal and pleochroic dye (not indicated in this figure). Cell (8) is placed between light source (10) and observer (24) with polarizer (28) and, for certain uses, analyzer (26). Cell (8) is provided with a source of direct current (20) shown as a battery but any source is the equivalent thereof. The source of current is connected to coatings (16) of the cell with switch (22) interposed.

FIGS. 2 and 3 show an enlarged view of the end of cell (8) with diagrammatic representation of the molecules of nematic liquid crystalline material (30) and dissolved pleochroic dye (40). The cell wall of FIGS. 2 and 3 have been treated as described above so that homeotropic orientation occurs when a voltage is applied as indicated in FIG. 3 and molecules (30) and (40) tend to orient at right angles to the walls as shown.

The cell of FIGS. 4 and 5 is shown in facial view. The inner cell walls have been oriented in parallel arrangement as described herein suitably by coating with $MgF_2$ at a low angle over the tin and/or indium oxide. The orientation of FIG. 4 with 0 impressed voltage is changed by an applied voltage of about 5 volts and molecules (30) and (40) align with the field as shown in FIG. 5.

FIGS. 6, 7, and 8 shows the behavior in a cell with twisted orientation. The cell walls are as for FIGS. 4 and 5 but with orientation in a vertical direction at the rearward wall and horizontally at the forward wall with no impressed voltage. When a voltage is impressed as in FIGS. 7 and 8 it is seen that molecules are oriented with the field. In FIG. 6 a portion of cell and contents are cut away to show orientation on the rearward wall.

FIGS. 9 and 10 show parts of the infrared spectrum of the compound of Example 19 as referred to in Example 24 below with absorbance as ordinates and frequency ($cm^{-1}$) as abscissae.

FIG. 11 shows transmittance curves of a cell as shown in above Figures containing a guest-host combination which is a 5% solution of 1,4-bis(p-n-octyloxybenzylidene amino)anthraquinone in 4-cyano-4-n-pentylbiphenyl. The upper curve is with impressed voltage, transmittance is ordinates and wavelengths (nm) abscissae in this and following figure.

FIG. 12 shows transmittance curves for a 5% solution of 1,4-bis(p-n-hexylbenzylidene amino)anthraquinone in a composite host composed of 10% p-hexyloxybenzylidene-p'-aminobenzonitrile, 32.7% p-ethoxybenzylidene-p'-n-butylaniline and 57.3% p-methoxybenzylidene-p'-n-butylaniline having net positive anisotropy.

FIGS. 13 and 14 show the variation of optical density as orinates with impressed voltage as abscissae for solutions of 1,4-bis(octyloxybenzylidene amino)anthraquinone in N-p-n-hexylbenzylidene-p'-aminobenzonitrile at 5% and 33% concentrations respectively. These can serve as optical shutters in electro-optical devices.

As indicated above it is necessary in forming guest-host combinations of the invention to employ dielectrically positive anisotropic nematic compounds or compositions. Included in typical compounds with positive anisotropy are the following with temperature at which conversion of crystalline to nematic state (C→N) and nematic to isotropic state (N→I) occurs:

TABLE 1

|  | C → N | N → I |
|---|---|---|
| N—p-n-hexylbenzylidene-p'-aminobenzonitrile | — | 51.5–52.5 |
| N—p-[(p-methoxybenzylidene)-amino]benzonitrile | 105 | 125 |
| N—p-[(ethoxybenzylidene)-amino]benzonitrile | 106 | 118 |
| N—p-cyanobenzylidene-p'-n-butoxyaniline | 70 | 93 |
| N—p-cyanobenzylidene-p'-octyloxyaniline | 83* | 107 |

*Smectic to nematic transition

Other useful positive anisotropic nematic liquid crystals are included in compounds

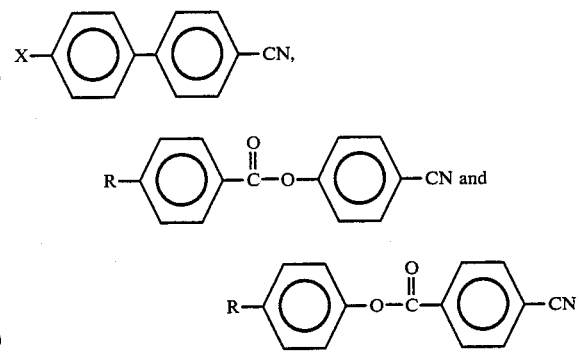

wherein R = alkyl or alkoxy of 1–7 carbon and X is alkyl or alkoxy of 1–9 carbon atoms.

Eutectic mixtures and combinations of all the above are also useful. Illustrative eutectic mixtures of 4'-substituted 4-cyano-4'-alkyl biphenyls are included in Table 2.

TABLE 2

| 4'sub | comp (Mol %) | °C. C → N | °C. N → I |
|---|---|---|---|
| $nC_5H_{11}$ | 59 | 3 | 37.5 |
| $nC_7H_{15}$ | 41 | | |
| $nC_5H_{11}$ | 55 | 0 | 57.5 |
| $nC_5H_{11}O$ | 15 | | |
| $nC_7H_{15}O$ | 13 | | |
| $nC_8H_{17}O$ | 17 | | |
| $nC_7H_{17}$ | 36 | 0 | 61 |
| $nC_3H_7O$ | 18 | | |
| $nC_5H_{11}O$ | 15 | | |
| $nC_7H_{15}O$ | 12 | | |
| $nC_8H_{17}O$ | 12 | | |

The above compounds with positive anisotropy can be employed with compounds such as the representative species of several useful groups of nematic liquid crystals with negative anisotropy shown in Table 3.

TABLE 3

| | °C. | |
|---|---|---|
| | C → N | N → I |
| N—p-methoxybenzylidene-p'-n-butylaniline | 19 | 45 |
| p-[N—(p-methoxybenzylidene)-amino]-phenyl-benzoate | 120 | 166 |
| N—p-methoxybenzylidene-p'-aminophenylacetate | 79 | 102 |
| p-azoxyanisole | 119 | 133 |
| p-n-butylbenzoic acid p'-n-hexyloxyphenyl ester | 56 | 87 |
| butyl-p-(p'-ethoxyphenoxycarbonyl)phenyl-carbonate | 73 | 127 |
| p(p'-ethoxyphenylazo)phenyl heptanoate | 73 | 127 |
| p(p'-ethoxyphenylazo)phenyl undecylenate | 64 | 107 |
| p-methoxybenzylidene-p'-butylaniline | 20 | 44.5 |
| N—(p-butyoxybenzylidene)-p'-pentylaniline | 41 | 80 |
| p-ethoxybenzylidene-p'-n-butylaniline | 38 | 78–9 |

Some groups of included compounds are

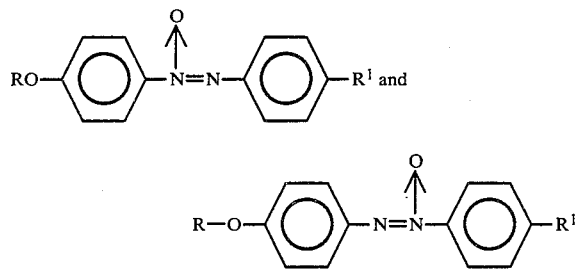

wherein R and R$^1$ are lower alkyl of C$_1$–C$_4$;

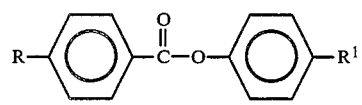

wherein R is alkyl of C$_1$–C$_7$ and R$^1$ is alkoxy of C$_1$–C$_7$ or wherein R is alkoxy of C$_1$–C$_7$ and R$^1$ is alkyl C$_1$–C$_7$;

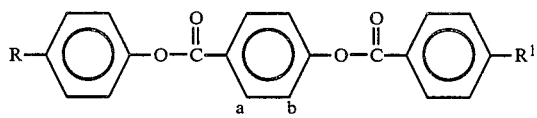

wherein R and R$^1$ are alkyl of C$_1$–C$_7$ and a or b are H or one can be Cl.

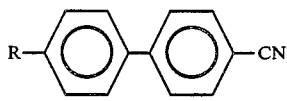

wherein R is alkyl or alkoxy of 1 to 10 carbon atoms and eutectic mixtures of such compounds.

When combined nematic compounds of Table 3 are with those of Tables 1 or 2 the combinations must have a net positive anisotropy. This may be achieved using only relatively low percentages of materials with high positive anisotropy when the other materials have relatively low negative anisotropy. Such combinations include, for example, A and B shown in Table 4, as percentages, both of which are nematic from at least −10° C. to +50° C.

TABLE 4

| | A | B |
|---|---|---|
| N—p-methoxybenzylidene-p'-n-butylaniline, | 57.3 | 51 |
| N—p-ethoxybenzylidene-p'-n-butylaniline and | 32.7 | 29 |
| N—p-hexylbenzylidene-p'-aminobenzonitrile. | 10.0 | 20 |

One useful commercially available nematic liquid crystalline composition contains approximately:
13.9%: n-pentyl cyclohexylbiphenyl cyanide
26.1%: n-propyl cyclohexylphenyl cyanide
35.9%: n-pentyl cyclohexylphenyl cyanide
24.1%: n-heptyl cyclohexylphenyl cyanide The N-substituted aminoanthraquinones in which R is H employed in guest-host compositions of the invention are made by reactions well known in the art for effecting transformations of groups on anthraquinone molecules. Several of these reactions are illustrated in the following examples. Other reactions will be evident to those familiar with the chemistry of such molecules.

The bis anils in which R and R' of the formula are taken together with N are prepared from 1,4- or 1,8-diaminoanthraquinones. The appropriate diamino anthraquinone is condensed with an aromatic aldehyde having suitable p-substituent, e.g., p-alkyl or p-alkoxy, by the basic procedures of the following examples to provide bis anils. Herein temperatures are in degrees centigrade, melting points are determined on a Kahn Electro-thermal Melting Point Apparatus in a capillary tube on a heated block with National Bureau of Standards calibrated thermometer (uncorrected).

EXAMPLE 1

In a round-bottomed flask fitted with thermometer, reflux condenser and stirrer is placed a mixture of 25 ml. glacial acetic acid and 50 ml methanol and in it is dissolved 2.38 g (0.1 mol) 1,4-diaminoanthraquinone. There is taken added 4.68 g (0.2 mol) p-octyloxybenzaldehyde and the mixture is heated at 90° for one hour. The reaction mixture is cooled to about 20°–25° and poured into ice water. The precipitated product is collected and recrystallized from ethylene glycol monomethyl ether or 1:1 methanol water as small purple needles. The crystallization is repeated twice more to obtain 1,4-bis(p-octyloxybenzylidene amino)anthraquinone m.p. 280° C. (dec) having absorption spectra in visual and infra red ranges as shown in FIGS. 9, 10, and 11 and of sufficient purity for use in guest-host combinations.

Analysis: Calculated for C$_{44}$H$_{54}$N$_2$O$_4$; 78.3% C, 8.06% H, 4.15% N: found 77.61% C, 7.46% H, 4.18% N.

EXAMPLE 2

To a stirred solution at 80° C. of 2.38 g (0.1 mol) 1,8-diaminoanthraquinone in 3.16 g (0.2 mol) p-n-butylbenzaldehyde is added about 1 ml. glacial acetic acid. Heating is continued for one hour and 50 ml methanol is added to dissolve the reaction mixture. The solution is poured into 100 ml ice water and the product collected and recrystallized from 1:1 methanol-water as above to give 1,8-bis(p-n-butylbenzylidene amino)anthraquinone as fine purple needles, melting with decomposition at 288°–9° C.

In order to determine the optical order parameter a cell is constructed to provide orientation of a host nematic medium. Two glass plates 5 mm thick and about 5×7 cm are cleaned thoroughly by washing successively in acid, alcohol, aqueous ammonia and distilled water and dried at 65° C. in an oven. Each plate is then coated on one surface by vapor deposition of indium oxide which makes the surface electrically conductive. The indium oxide surfaces are oriented, i.e. rendered anisotropic, by unidirectional rubbing under slight moderate pressure for about 20 strokes with a cotton pad impregnated with an aqueous suspension of zirconium oxide. Each plate is carefully rinsed with distilled water, placed on edge in an oven and dried for one hour at 65° C. Two strips of polytetrafluoroethylene sheets about 12μ thick are cut about 5 cm long and applied to the oriented surface of one plate at a distance of about 5 cm and the other plate applied with orientation directions of the two plates at right angles. The assembly is then fastened together.

A solution of the pleochroic dye to be tested is prepared by warming about 0.5 g (10 drops) of the nematic combination of Table 4 to 65° C. (i.e., above the isotropic melting temperature) and dissolving about 50 mg of the dyestuff therein. This should provide an optical density of approximately 2 at 655 nm. With the solution still above the isotropic melting point one edge of the cell is applied to the dyestuff solution which is drawn up to fill the cell by capillary action. After cooling for a period of time the temperature of the solution drops below the isotropic point into the nematic region and testing can continue.

If desired from about 0.1 to about 50% of chiral agent such as chloesteryl nonanoate can be incorporated at this time if desired. The amount used is determined by the effect desired. Smaller amounts (up to about 5–10%) are used to improve the spontaneous response of such guest-host mixtures to withdrawal of an electrical field. Larger amounts influence the composition to have a cholesteric structure instead of the more usual twisted nematic structure so that the use of a polarizer is not required. This phenomenon is well known in the art.

Electrical contacts are made to the indium oxide coatings on the exposed ends of the glass plates forming the cell using alligator clips and these are connected to a switching circuit including a source of low voltage direct current capable of providing 50–100 microamperes over the range of 0.8 to 10 volts or of sufficiently high fixed voltage. The cell is then placed in the sample beam of a spectrophotometer (such as Perkin Elmer Model 350) having polarizing filters in both reference and sample beams and parallelly arranged analyzers. The filters give a neutral gray color when crossed. The transmittance is scanned over the range of 400–750 nm. and recorded graphically with no voltage applied to the cell (switch off) and with a voltage exceeding the threshold for the particular host (switch on). The resulting graphs generally resemble those shown in FIG. 11 in which the upper curve represents excellent transmittance (low absorption) at the peaks at 565 and 640 nm with no impressed voltage, and the lower curve shows extensive absorption with impressed voltage. Values of S are calculated from these transmission (or absorption) curves as explained herein above. A similar device is employed as a shutter for a camera, using sufficiently high concentrations of dyestuff to provide substantially complete exclusion of light to substantial transparency with changing electrical field. The behavior as a shutter is illustrated by FIG. 13 and FIG. 14. The residual color can be corrected when necessary by addition of suitable filters.

The procedures of Examples 1 and/or 2 were repeated employing appropriate amounts of aromatic aldehydes having various substituents to prepare bis anil dyes of the general formula $C_{14}H_6O_2-(N=C_6H_4-X)_2$ and the various bis anils were tested for efficiency as guests in guest-host combinations using concentrations of 1% in 4-pentyloxy-4'-cyanobiphenyl and calculating values of the optical order parameter S as described above. In Table 5 are shown examples of compounds of the invention prepared by the above procedure indicating the substituent X in the para-position of the phenyl group melting points in °C. (all with decomposition) and the value of S determined by the above procedure. Each substance shows pleochroism between blue and substantially colorless except the 1,8-substituted anthraquinones which are between reddish and colorless. Alkyl groups are straight chain (normal) unless otherwise indicated and substituents are in the 1,4-positions except where noted.

TABLE 5

| Example | X group | m.p. | S |
|---|---|---|---|
| 3 | —$CH_3$ | 273 | 0.58 |
| 4 | —$C_2H_5$ | 270 | 0.79 |
| 5 | —$C_4H_9$* | 288 | 0.65 |
| 6 | —$CH_2CH(CH_3)_2$ | 268 | 0.81 |
| 7 | —$C_5H_{11}$ | 270 | 0.83 |
| 8 | —$C_6H_{13}$ | 272 | 0.85 |
| 9 | —$C_7H_{15}$ | 273 | 0.86 |
| 10 | —$C_8H_{17}$ | 275 | 0.91 |
| 11 | —$C_8H_{17}$* | 292 | 0.78 |
| 12 | —$C_{10}H_{21}$ | 279 | 0.70 |
| 13 | —$C_{10}H_{21}$* | 294 | 0.68 |
| 14 | —$C_{16}H_{31}$ | 281 | 0.80 |
| 15 | —$OCH_3$ | 281 | 0.60 |
| 16 | —$OC_2H_5$ | 270 | 0.70 |
| 17 | —$OC_5H_{11}$ | 272 | 0.83 |
| 18 | —$OC_6H_{13}$ | 274 | 0.87 |
| 19 | —$OC_6H_{13}$* | 296 | 0.75 |
| 20 | —$OC_7H_{15}$ | 276 | 0.90 |
| 21 | —$OC_8H_{17}$ | 280 | 0.93 |
| 22 | —$OC_8H_{17}$* | >300 | 0.85 |
| 23 | —$C_6H_5$ | 265 | 0.79 |
| 24 | —$N(CH_3)_2$ | 246 | 0.72 |
| 25 | —$NO_2$ | 240 | 0.69 |
| 26 | —CN | 256 | 0.75 |

*1,8-bis substituted anthraquinone.

EXAMPLE 27

Infrared spectra are determined on solutions of various compounds of the invention of Examples 1–23 in dispersion using a grating infra red spectrometer (Perkin Elmer 337) and slow scan in KBr. It is found that all compounds show stretch absorption at 2950–2800 $cm^{-1}$ and 3375 $cm^{-1}$ frequencies. More characteristic absorption patterns are shown in the shorter frequencies. Some of the characteristic bands below 1300 $cm^{-1}$ are given in Table 6 for above compounds. The curve for the compound of Example 1 ($X=OC_8H_{17}$) is shown in FIG. 10.

TABLE 6

| Example | X | Bands and Peaks |
|---|---|---|
| — | $OCH_3$ | 1150–1250, 1095, 1010, 810–860, 760, 750, 635, 600, 590, 510, |
| 16 | $OC_2H_5$ | 1150, 1110, 1040, 780, 770, 650, 615 |
| 17 | $OC_5H_{11}$ | 1150, 1070, 1000, 980, 970, 870, 780, 770, 670, 650. |
| 20 | $OC_7H_{15}$ | 1290, 1250, 1150, 1100, 1010, 825, 725, 645, 615, 505. |
| — | $CH_3$ | 1200, 1100, 1010, 825, 750, 590, 475 |

TABLE 6-continued

| Example | X | Bands and Peaks |
|---|---|---|
| 2 | $C_4H_9$ | 1150–1250, 1100, 980, 905, 860, 780, 770, 650, 510 |
| 7 | $C_5H_{11}$ | 1150, 1110, 1010, 900, 760, 705, 550, 500 |
| 10 | $C_8H_{17}$ | 1150, 1050, 950, 880, 720, 525 |

EXAMPLE 28

A reflecting electro-optical cell is made by filling an electric field cell with compositions which is nematic with high positive anisotropy at ambient temperatures, a means of eliminating the necessity for an external polarizer and a dye with very high optical order parameter and suitable means for providing the desired surface boundary conditions such as surfaces coated at an angle with $MgF_2$ as described above in connection with FIGS. 4 and 5. A suitable combination is a mixture of equal parts by weight of N-p-butoxy-, N-p-hexyloxy-, and N-p-octanoyloxy-benzylidineaminobenzonitriles to which is added 5–10% by weight of an optically active nematic material such as the active amyl ester of cyanobenzylideneaminocinnamic acid. This addition provides a cholesteric host material and enables the dye to efficiently absorb both polarizations of light in the relaxed state. In an applied field the cholesteric host undergoes a phase transition into a nematic state with homeotropic alignment. In this state the dye molecules are aligned parallel to the incident light and are not absorbing.

EXAMPLE 29

Five parts of 1,5-dichloroanthraquinone are added to 20 parts 4-amino-1-cyclohexylbenzene containing 5 parts sodium acetate and 0.1 part copper metal. The mixture is stirred and refluxed for two hours to give a bright red slurry which is cooled and mixed with petroleum ether. The precipitated 1,5-bis(4-cyclohexylphenylamino)anthraquinone is recrystallized as a dull reddish powder.

Ten milligrams of the above bis(1,5-cyclohexylphenylamino)anthraquinone are dissolved with gentle heating in 1.0 gm of a mixture of n-pentyl, n-propyl and n-heptyl-cyclohexylphenyl cyanides (35.9, 36.1 and 24.1% respectively) in 13.9% of n-pentylcyclohexylbiphenyl cyanide which has dielectrically positive anisotropy to yield a guest-host composition. The optical order parameter was measured as 0.70 by the procedure of Example 2. The color shifts from magneta to colorless with transmittance curves as shown in FIG. 15 absorption maximum at 555 nm.

EXAMPLE 30

In a procedure somewhat similar to that of Example 29, five parts of 1-butylamino-4-chloroanthraquinone are added to 20 parts 4-aminobiphenyl, 0.1 gm copper and 5 gm sodium acetate and 100 parts nitrobenzene. After refluxing for about 2 hours the blue green dye (1-butylamino-4-biphenylamino)anthraquinone which has an optical order parameter of 0.7 is recovered. The optical order parameter is 0.7.

EXAMPLE 31

Five parts of 1-(n-pentylanilino)-4-hydroxyanthraquinone are refluxed in 20 parts cyclohexylamine in the presence of five parts of boric acid to yield 1-(n-pentylanilino)-4-cyclohexylamino anthraquinone as a bright blue dye.

Incorporation of this pleochroic dyestuff in a positive nematic liquid crystal mixture as in Example 29 above provides a blue guest-host mixture in which the dye has an optical order parameter of 0.65.

EXAMPLE 32

Five parts of leucoquinizarin are condensed with 20 parts 4-n-butylcyclohexylamine in the presence of a stoichiometric amount of boric acid in nitrobenzene to yield bis(1,4-n-butylcyclohexylamino)anthraquinone as a bright sky blue dye.

A 1% solution of this dye in a mixture of nematic liquid crystals as in Example 29 gives a blue guest-host mixture which becomes colorless. The optical order parameter is 0.7.

EXAMPLE 33

Leucoquinizarin is converted to leuco-1-amino-4-hydroxy anthraquinone with ammonia and then reacted with two amine bases, e.g. n-butylamine and p-n-butylaniline. After heating to 90° for two hours and oxidation with air and copper sulfate, 4-(p-n-butylphenylamino)-anthraquinone is obtained as a clear blue pleochroic dye with an optical order parameter of 0.7.

EXAMPLE 34

1,5-Diaminoanthraquinone is dissolved in o-dichlorobenzene and treated with sulfuryl chloride to yield the 3,4,7,8-tetrachloroanthraquinone intermediate which is then condensed with 2 equivalents of p-n-hexylaniline and the α-chlorine atoms are displaced leaving the 4,8-bis-p-hexylphenylamino, 1,5-diamino-2,6-dichloroanthraquinone as a pure blue dye with an optical order parameter of 0.75.

EXAMPLE 35

1-(methylamino)-2-undecyl-y-octylanilino anthraquinone is prepared by condensing 1 equivalent p-n-octylaniline with 4-bromo-1-methylamino anthraquinone copper and sodium acetate as in Example 26 followed by alkylation by reacting this dye with undecyl aldehyde in nitrobenzene-piperidine. This blue red dye has an optical order parameter of 0.7. The transmittance curves of the color shift are shown in FIG. 16.

EXAMPLE 36

1-Nitroanthraquinone is refluxed with an excess of cyclohexylamine in o-dichlorobenzene to yield 1-cyclohexylamino anthraquinone which is further brominated in aqueous pyridine to yield the corresponding 1-cyclohexylamino-4-bromoanthraquinone. This compound is further condensed with p-amino acetanilide to yield 1-cyclohexylamino-4-(p-acetaminoanilino)anthraquinone as a bright green pleochroic dye having an optical order parameter 0.7.

EXAMPLE 37

One equivalent (2.4 g) 1,4-dihydroxyanthraquinone is added to a flask fitted with a reflux condenser, stirrer, containing 1 g boric acid and 0.5 g stannous chloride and 30 g 2-phenylethylamine. Stirring and heating to 130° for two hours and pouring into a 10% HCl solution yields bis(1,4-phenethylamino)anthraquinone as a pleochroic blue dye with an optical order parameter.

EXAMPLES 38-47

A series of pleochroic dyes are produced by the procedure of Example 29 in which color, the substituent —(NRR′), and m of the general formula above (where x=0) and positions of —(NRR′) an anthraquinone nucleus are as indicated in Table 7 together with optical order parameter measured. The 1,4-cyclohexylene radical is indicated by S in the ring.

The pleochroic dyes are rigorously purified prior to testing by crystalization and subsequent chromatographic separation using high pressure liquid chromatography. General procedures is to recover the desired dye using toluene or toluene/acetic acid. The high pressure liquid chromatograph (HPLC) is a Walters Associates HPLC using alumina columns. Evaporation of solvent under reduced pressure recovers the analytically pure dyestuff. Table 7 indicates the pleochroic behavior of the various pleochroic dyes.

TABLE 7

| Example | Color | —(NRR′) Positions | —(NRR′) | m | Optical Order Parameter |
|---|---|---|---|---|---|
| 38 | red | 1,5 | $C_5H_{11}$—S—⟨⟩—NH— | 2 | 0.75 |
| 39 | blue | 1,5 | Ph—Ph—NH— | 2 | 0.73 |
| 40 | bluish red | 1,8 | $C_{12}H_{25}$—⟨⟩—NH— | 2 | 0.55 |
| 41 | maroon | 1,8 | $NO_2$—⟨⟩—S—⟨⟩—NH— | 2 | 0.8 |
| 42 | red | 1,8 | F—⟨⟩—NH— | 2 | 0.55 |
| 43 | red | 1,5 | $C_4H_9$—⟨⟩—O—⟨⟩—NH— | 2 | 0.76 |
| 44 | red | 1,5 | Ph—O—⟨⟩—NH— | 2 | 0.7 |
| 45 | blue | 1,4 | Ph—O—⟨⟩—NH— | 2 | 0.72 |
| 46 | reddish blue | 1,8 | S—S—NH— | 2 | 0.65 |
| 47 | red | 1 / 5 | $C_5H_{11}$—⟨⟩—NH— / $C_8H_{17}O$—⟨⟩—NH— | 2 | 0.73 |

EXAMPLES 48-56

Further pleochroic dyes useful in guest-host combinations are prepared by condensing substituted dichloroanthraquinones with various amines by refluxing in a solvent such as nitrobenzene in the presence of sodium acetate and cupric acetate. Such dyestuffs are shown in Table 8. Intermediates are known or readily available by known reactions.

nitrogen atmosphere. The reaction is allowed to proceed for two hours at 185° C. Upon cooling, 50 g methanol is added and the crude dye separated by vacuum filtration. Subsequent purification by recrystalization and chromatography from alumina using toluene as the elvent affords the magneta pleochroic dye 1,5-bis(4-cyclohexylphenylamino)-anthraquinone. The optical order parameter was measured as 0.7.

TABLE 8

| Example | Color | Q Position | Q | (NRR') Position | (NRR') | m | x | Optical Order Parameter |
|---|---|---|---|---|---|---|---|---|
| 48 | yellow green | 5,8 | OH | 1,4 |  | 2 | 2 | 0.7 |
| 49 | blue | — | — | 2,6 | 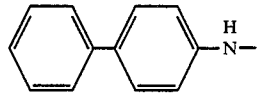 | 2 | — | 0.68 |
| 50 | red | — | — | 1,5 | 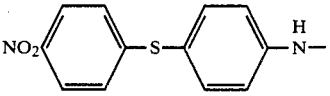 | 2 | — | 0.75 |
| 51 | red | — | — | 1,5 | 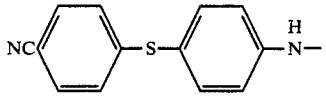 | 2 | — | 0.8 |
| 52 | red | — | — | 1,5 | 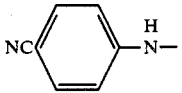 | 2 | — | 0.73 |
| 53 | purple | — | — | 1,8 | 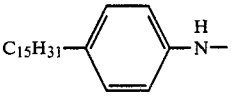 | 2 | — | 0.65 |
| 54 | blue | — | — | 1,4 | 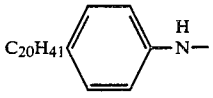 | 2 | — | 0.8 |
| 55 | red | — | — | 1,5 | 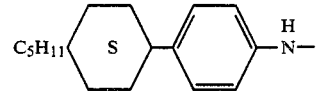 | 2 | — | 0.80 |
| 56 | | — | — | 1,5 | 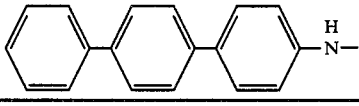 | 2 | — | 0.83 |

EXAMPLE 57

The procedure of Example 48-56 is illustrated by the formation of 1,5-bis(4-cyclohexylphenyl)amino anthraquinone.

In a round bottom flask equipped with stirrer, thermometer, and nitrogen inlet is added 2.77 g (0.1M) 1,5-bischloroanthraquinone and 3.5 g (0.2M) of 4-cyclohexylaniline. 3.0 g anhydrous sodium acetate and 0.1 g anhydrous copper acetate are added as acid acceptor and reaction catalyst respectively. 50 g nitrobenzene are added and the stirred mass is heated to reflux under

EXAMPLE 58

A convenient method for introduction of a substituted amino group in place of a hydroxy group is to heat the hydroxy substituted anthraquinone with the amine in the presence of boric acid usually in an inert solvent such as nitrobenzene. The use of quinizarin (1,4-dihydroxyanthraquinone) or leucoquinizarin to obtain 1,4-bis substituted anthraquinones is accompanied by the formation of the intermediate boric acid ester prior to the reaction with the appropriate aniline derivative.

Mixed group replacement may be accomplished by using chloro-hydroxy substituted anthraquinone. This subject is treated thoroughly in Lubs, H. A., "The Chemistry of Synthetic Dyes And Pigments", Rienhold Publishing Co., NY. NY., Chap. 7, pp. 335–550. This also facilitates the formation of anthraquinones having two different substituents, e.g., Example 47 above and 58 below.

1-Hydroxy-4-chloroanthraquinone is condensed with pleochroic dye having an optical order parameter of 0.72.

EXAMPLES 59–67

A series of pleochroic dyes is prepared using the boric acid condensation reaction described in Example 58 as set forth in Table 9. In Examples 66 and 67 marked with asterisks, stannous chloride is also included as in Example 37 above.

TABLE 9

| Example | Color | Q Position | Q | (NRR') Position | (NRR') | m | x | Optical Order Parameter |
|---|---|---|---|---|---|---|---|---|
| 59 | reddish blue | 5,8 | Cl | 1,4 | ⌬—O—⌬—NH— | 2 | 2 | 0.75 |
| 60 | blue green | 5,8 | OH | 1,4 | CH₃—⌬—NH— | 2 | 2 | 0.75 |
| 61 | green | 5,8 | NO₂ | 1,4 | C₈H₁₇—O—⌬—NH— | 2 | 2 | 0.68 |
| 62 | bluish green | { 5 / 8 / 1 } | { NO₂ / OH / C₅H₁₁NH— } | 4 | C₉H₁₉—O—⌬—NH— | 1 | 3 | 0.72 |
| 63 | blue | — | — | 1,4 | NO₂—⌬—S—⌬—NH— | 2 | — | 0.8 |
| 64 | blue | — | — | { 1 / 4 } | { NO₂—⌬—S—⌬—NH— / C₈H₁₇—O—⌬—NH— } | 2 | — | 0.8 |
| 65 | reddish blue | 5,8 | Cl | 1,4 | ⌬—O—CH₂—⌬—NH— | 2 | 2 | 0.75 |
| 66* | bluish green | — | — | 1,4 | C₁₀H₂₁—O—⌬—NH— | 2 | — | 0.75 |
| 67* | blue green | — | — | 1,4 | ⌬—CH₂—⌬—CH₂NH— | 2 | — | 0.8 |

1 equivalent p-(n-decyl)aniline in the presence of boric acid to yield 1-(p(n-decyl)anilino)-4-chloroanthraquinone which is then condensed with 1 equivalent 2-aminonaphthalene in the presence of copper acetate-sodium acetate and when purified yields 1-p(n-decyl)anilino-4-naphthylamino-anthraquinone as a blue green

EXAMPLE 68

The guest-host combinations of this invention are especially useful because of their unusual fastness to light. To show the stability of these combinations a field effect device was constructed and a guest-host mixture of nematic liquid crystals of Example 29 containing 1% 1,4-bis(4-phenylanilino)anthraquinone (prepared as for the 1,5 isomer in Example 39) was used as the guest-host nematic component. The test sample was placed in an Atlas Weatherometer for 100 hrs. at 60° C. using a xenon U.V. light source with output at 340 nm of 0.115 mn/cm$^2$. Absorbtion spectra show no decrease in $\lambda_{max}$ of the pleochroic dyestuff after 100 hours and less than 10% increase in current as measured across the electrode surfaces. The transmittance curves for the color shift are shown in FIG. 17.

EXAMPLE 69

The improvement achieved by compositions of the invention over unsubstituted bis-phenylamino anthraquinone in guest-host combinations is illustrated by comparison of a composition of the invention (A) using the anthraquinone of Example 58 in which each phenyl group is substituted by an octyloxy group (in the 4 position of Ar of the general formula) with a composition (B) in which no substituent is present in the same position. Solutions are prepared in the dielectrically positive nematic liquid crystal mixture used in Example 29 at the same concentration and the transmittance curves measured as voltage is increased as described for FIGS. 13 and 14. The results are shown in FIG. 18. The higher optical order parameter of about 0.7 of composition B demonstrates the increased contrast ratios, lower colored backgrounds and increase brilliance attainable in electro-optical devices using compositions of the invention.

Similar optical order parameters to those described above in Examples 3–26 and 29–67 are obtained when chiral agents such as cholesteryl nonanoate are included in the nematic liquid crystalline materials in various amounts. When the amounts are small, i.e. about 0.5% it is found that there is more rapid reordering when an impressed voltage is removed.

EXAMPLE 70

Three 1,4 bis(p-alkyl)phenylamino anthraquinone pleochroic dyes were prepared by reacting 1,4 dichloroanthraquinone with an excess of n-alkyl aniline in the presence of a catalytic amount of copper acetate (0.1 g/0.1 mole) and sodium acetate (10 g/0.1 mole) in nitrobenzene. The alkylaniline was predistilled to remove any undesirable oxidation products which may have been present.

The reactions were run in a three-necked flask fitted with a condenser and stirrer and nitrogen inlet. The dyes were produced on gentle reflux and after approximately one hour, the reactions were terminated. The crude dyes were recovered after the addition of ethanol, filtering and washing with water to remove excess sodium and copper acetates. The dyes were dried and redissolved in a solvent, filtered and recovered from the column of a high pressure liquid chromatograph.

By the use of p-ethyl- and p-butylanaline in reaction with the 1,4 dichloroanthraquinone the corresponding 1,4 substituted anthraquinone dyes were prepared.

In order to compare the above dyes of the present invention with those not included within the present invention, another pleochroic dye falling outside the scope of the present invention was prepared by reacting p-methylaniline with 1,4 dichloroanthraquinone to provide 1,4-bis(p-methylphenylamino)anthraquinone.

The three dyes were tested for pleochroic character in a liquid crystal display cell having 1.5 mm thick glass, NESA electrode 4 cm$^2$ in area, a silicon monoxide alignment layer vapor deposited at angles of 60° and 85° and 150°/150° A. The cell walls were spaced 10 micrometers. The measuring device was a Beckman model 5230 spectrophotometer equipped with cell holders and crystal polarizers located at reference and sample beams.

The dyes were tested by dissolving each of the dyes at a concentration of 1%, by weight in a liquid crystal mixture comprising by weight approximately 14% trans-4-n-pentyl-(4'-cyanobiphenylyl)cyclohexane, 26% trans-4-n-propyl-(4'cyanophenyl)cyclo-hexane, 36% trans-4-n-pentyl-(4'-cyanophenyl)cyclohexane, and 24% trans-4-n-heptyl-(4'cyanophenyl)cyclohexane. This mixture is available commercially from EM Laboratories, Inc. under the commercial trade designation Nematic Phase 1132 TNC "Licristal". The guest-host mixture was injected into the cell and the cell was heated to the isotropic temperature of the guest-host mixture and cooled to assure good alignment of the liquid crystals with the inner walls of the display. Transmission and absorption data were measured at 400–750 nm in the $A_o$ (field off) and $A_1$ (field on) states. The temperature was in some cases varied to measure $A_1$ and $A_o$ at different temperatures. Device stimulation was by variable frequency AC with driving voltage variable to about 20 volts. Calculation of the order parameter, S, from $A_1$, $A_o$ values shows the relative alignment relationship between the liquid crystal host and the guest dye molecule.

The 1,4-bis(p-butylphenylamino)anthraquinone dye had an order parameter of 0.78 while the 1,4-bis(p-ethylphenylamino)anthraquinone dye had an order parameter of 0.73. In contrast the corresponding 1,4-bis(p-methylphenylamino)anthraquinone dye had an order parameter of 0.32. The order parameter for the 1,4-bis phenylaminoanthraquinone was also measured and found to be 0.26.

From the above discussion, it can be seen that the p-alkyl substituted 1,4-bis phenylamino anthraquinones wherein alkyl is 2 carbon atoms or greater are very different in terms of properties, such as order parameter, than corresponding dyes wherein the alkyl group is methyl or where no alkyl substituent is present.

EXAMPLE 71

The pleochroic dye 1-cyclohexylphenylamino, 4-hydroxyanthraquinone was prepared by combining equimolar quantities of 1-chloro-4-hydroxy anthraquinone and 4-cyclohexylaniline and heating in the presence of a catalytic amount of copper acetate (0.1 g/0.1 mole) and sodium acetate (10 g/0.1 mole) in nitrobenzene. The reaction was run and the dye separated and tested as in Example 70. The dye had an absorption maxima at 594 nm and an optical order parameter of 0.75.

EXAMPLE 72

The pleochroic dye 1-butylphenylamino anthraquinone was prepared by dissolving 1-chloroanthraquinone in a 10-fold excess of 4-n butylaniline. Copper acetate and sodium acetate were added as in Example 70. Since the n-butylaniline is a solvent in this case no nitrobenzene was added. The dye, when tested as in Example 70, had an absorption maxima at 515 nm and an order parameter of 0.65.

EXAMPLE 73

The pleochroic dye 1,5-bis(p-ethylphenylamino)anthraquinone was prepared by reaction of 1,5 dichloroanthraquinone with p-ethylaniline. The dye had an absorption maxima at 540 nm and an optical order parameter of 0.73.

Other 1,5 bis substituted anthraquinone dyes can be prepared as above and exhibit a magenta color. Dye extinction coefficients vary from 1.6 to $1.3 \times 10^4$ (molar) as the chain length of the alkyl or alkoxy ballast groups increases.

What is claimed is:

1. As a composition of matter the combination having dielectrically positive anisotropy comprising at least one nematic liquid crystalline material having dielectrically positive anisotropy and dissolved therein a pleochroic dyestuff of the general formula:

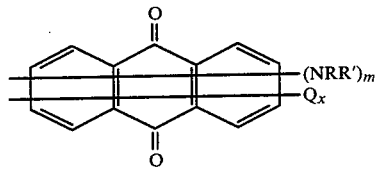

wherein substituents
(NRR') and Q may be in positions 1 through 8,
Q is F, Cl, $NO_2$, $NH_2$, NH(Alk), OH,
x is 0, 1, 2, 3,
m is 1 or 2,
R is H,
R' is cyclohexyl, bicyclohexyl or $-(CH_2)_p-Ar$ where p is 0, 1 or 2 and Ar is aryl of 6 to 10 carbon atoms substituted in the 4 position by $-NHCOCH_3$, CN, $C_bH_{2b+1}$, $-OC_nH_{2n+1}$, cyclohexyl, 4—(Alk)—cyclohexyl or

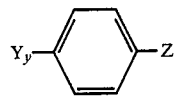

where y is 0 or 1
Y is $CH_2$, O, S, or $OCH_2$
Z is H, $NO_2$, CN, $-C_nH_{2n+1}$, $-OC_nH_{2n+1}$, F, Cl, and, when y is 0, Z can also be $-C_6H_5$, and
wherein Ar can be substituted in from 0 to 2 further positions by CN, $-C_nH_{2n+1}$, $-OC_nH_{2n+1}$, $NH_2$, or OH, provided that when p is 1 or 2 Ar can be unsubstituted aryl, and
when m is 2, the substituent R and R' taken together with N to which R is attached can alternatively be

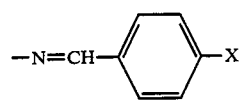

where X is $NO_2$, CN, $-C_nH_{2n+1}$, $-OC_nH_{2n+1}$, or $N(Alk)_2$,
n is 1 to 20,
b is 2 to 20; provided that when p is 1 or 2 b can be 1 to 20, and
Alk is alkyl of 1-8 carbon atoms.

2. A composition according to claim 1 wherein said pleochroic dye is present in an amount of about 0.1 to about 50 percent by weight.

3. The composition of matter according to claim 1 wherein the pleochroic dyestuff is of the general formula:

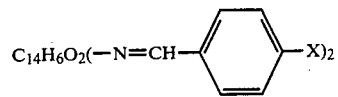

where $C_{14}H_6O_2$ is 1,4- or 1,8-divalent residue of anthraquinone and X is nitro, cyano, phenyl, alkyl of 1–20 carbon atoms, alkoxy of 1–20 carbon atoms or di(lower alkyl)amino, containing alkyl groups of 1–4 carbon atoms.

4. The composition of matter according to claim 1 wherein there is additionally present from about 0.1 to 10 percent by weight of isotropic dyestuff having color contrast with respect to the normal color of the pleochroic dyestuff.

5. The composition according to claim 1 wherein the nematic liquid crystalline material comprises n-pentyl cyclohexylbiphenyl cyanide in a combination of n-propyl-, n-pentyl- and n-heptyl-cyclohexylphenyl cyanide.

6. The composition according to claim 1 wherein the nematic liquid crystalline material comprises combinations of 4-cyano-4'-alkyl biphenyls.

7. The composition according to claim 1 wherein the pleochroic dyestuff comprises 1,5-bis(p-(4-n-pentylcyclohexyl)phenylamino)anthraquinone.

8. The composition according to claim 1 wherein the pleochroic dyestuff comprises 1,5-bis(biphenylamino)anthraquinone.

9. The composition according to claim 1 wherein the pleochroic dyestuff comprises bis(4-(p-nitrophenylthio)phenylamino)anthraquinone in which the groups are in 1,4-, 1,5- or 1,8-positions.

10. The composition according to claim 1 wherein the pleochroic dyestuff comprises 1,4-bis(4-n-decyloxyphenylamino)anthraquinone.

11. The composition according to claim 1 wherein the pleochroic dyestuff comprises 1-(p-n-butylphenylamino)anthraquinone.

12. The composition according to claim 1 wherein the pleochroic dyestuff comprises 1-(p-cyclohexylphenylamino)anthraquinone.

13. The composition according to claim 1 wherein the pleochroic dyestuff comprises 1-(p-cyclohexylphenylamino)-4-hydroxy-anthraquinone.

14. The composition according to claim 1 wherein the pleochroic dyestuff comprises 1,5-bis(p-cyclohexylphenylamino)anthraquinone.

15. The composition according to claim 1 wherein the pleochroic dyestuff comprises 1,5-bis(p-n-butylphenylamino)anthraquinone.

16. The composition according to claim 1 wherein the pleochroic dyestuff comprises 1,5-(p-n-nonyloxyphenylamino)anthraquinone.

17. The composition according to claim 1 wherein the pleochroic dyestuff comprises 1-(p-n-hexylphenylamino)-5-hydroxy-anthraquinone.

18. The composition according to claim 1 wherein the pleochroic dyestuff comprises 1,4-bis(p-n-butylphenylamino)anthraquinone.

19. The composition according to claim 1 wherein the pleochroic dyestuff comprises 1,4-bis(p-cyclohexylphenylamino)anthraquinone.

20. The composition according to claim 1 wherein the pleochroic dyestuff comprises 1,5-bis(biphenylamino)-anthraquinone.

21. The composition according to claim 1 wherein the pleochroic dyestuff comprises 1-(p-n-octyloxyphenylamino)-4-amino-anthraquinone.

22. The composition according to claim 1 where the pleochroic dyestuff comprises 1-(p-phenyl)-phenylamino-5-nitro-anthraquinone.

23. The composition according to claim 1 comprising additionally chiral agent in an amount of about 0.1 to about 50% by weight based on the nematic liquid crystalline material.

24. The composition according to claim 23 wherein the chiral agent is present in an amount of up to 10% of the weight of nematic liquid crystalline material.

25. The composition according to claim 24 wherein the chiral agent is cholesteryl nonanoate.

26. In an electro-optical device wherein an electrical field is imposed or withdrawn from action on a cell comprising liquid crystalline material having dissolved therein a pleochroic dye between transparent electroded glass plates, the improvement wherein the liquid crystalline material has dielectrically positive anisotropy and comprises at least one nematic liquid crystalline material having dielectrically positive anisotropy and the dissolved pleochroic dyes has the general formula:

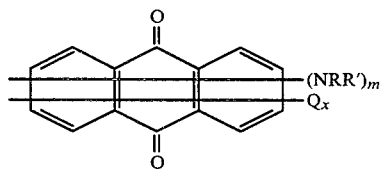

wherein substituent (NRR') and Q may be in positions 1 through 8,

Q is F, Cl, $NO_2$, $NH_2$, NH(Alk), OH, x is 0, 1, 2, 3, m is 1 or 2,

R is H,

R' is cyclohexyl, bicyclohexyl or $-(CH_2)_p-Ar$ where p is 0, 1 or 2 and Ar is aryl of 6 to 10 carbon atoms substituted in the 4 position by $-NHCOCH_3$, CN, $C_bH_{2b+1}$, $-OC_nH_{2n+1}$, cyclohexyl, 4—(Alk)—cyclohexyl or

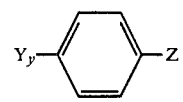

where y is 0 or 1

Y is $CH_2$, O, S, or $OCH_2$

Z is H, $NO_2$, CN, $-C_nH_{2n+1}$, $-OC_nH_{2n+1}$, F, Cl, and, when y is 0, X can also be $-C_6H_5$, and wherein Ar can be substituted in from 0 to 2 further positions by CN, $-C_nH_{2n+1}$, $-OC_nH_{2n+1}$, $NH_2$, or OH, provided that when p is 1 or 2 Ar can be unsubstituted aryl, and when m is 2, the substituent R and R' taken together with N to which R is attached can alternatively be

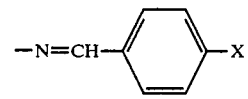

where

X is $NO_2$, CN, $-C_nH_{2n+1}$, $-OC_nH_{2n+1}$, or $N(Alk)_2$, n is 1 to 20, b is 2 to 20; provided that when p is 1 or 2 b can be 1 to 20, and Alk is alkyl of 1–8 carbon atoms.

27. The improvement according to claim 26 wherein the dissolved pleochroic dye has the general formula:

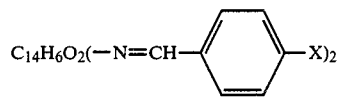

where $C_{14}H_6O_2$ is 1,4- or 1,8-divalent residue of anthraquinone and X is nitro, cyano, phenyl, alkyl of 1–20 carbon atoms, alkoxy of 1–20 carbon atoms or di(lower alkyl)amino containing alkyl groups of 1–4 carbon atoms.

28. The composition according to claim 1 wherein substituents (NRR') and Q may be in any of positions 1, 2, 4, 5, 6 and 8.

29. The composition according to claim 1 wherein substituents (NRR') and Q may be in any of positions 1, 4, 5 and 8.

30. The device according to claim 26 wherein substituents (NRR') and Q may be in any of positions 1, 2, 4, 5, 6 and 8.

31. The device according to claim 26 wherein substituents (NRR') and Q may be in any of positions 1, 4, 5 and 8.

32. The device according to claim 31 wherein the liquid crystalline material comprises n-pentyl cyclohexylbiphenyl cyanide in a combination of n-propyl-, n-pentyl- and n-heptyl-cyclohexylphenyl cyanide.

* * * * *